United States Patent [19]

Nichols

[11] 4,346,187

[45] Aug. 24, 1982

[54] FLAME RETARDANT POLYPROPYLENE COMPOSITIONS CONTAINING TRITYL SYNERGISTS

[75] Inventor: George M. Nichols, Evantson, Ill.

[73] Assignee: Borg-Warner Chemicals, Inc., Parkersburg, W. Va.

[21] Appl. No.: 18,700

[22] Filed: Mar. 8, 1979

Related U.S. Application Data

[63] Continuation-in-part of Ser. No. 853,617, Nov. 21, 1977, abandoned, which is a continuation-in-part of Ser. No. 788,187, Apr. 18, 1977, abandoned, Ser. No. 801,174, May 27, 1977, abandoned, and Ser. No. 788,185, Apr. 18, 1977, abandoned.

[51] Int. Cl.$^3$ .................... C08K 5/13; C08K 5/09; C08K 5/06; C08K 5/05; C08K 5/47; C08K 5/34; C08K 5/18; C08K 5/36
[52] U.S. Cl. .................... 524/83; 252/609; 524/94; 524/99; 524/112; 524/144; 524/189; 524/196; 524/251; 524/289; 524/287; 524/323; 524/367; 524/369; 524/384; 524/471; 524/462; 524/466; 524/467; 524/469; 524/582
[58] Field of Search .................... 260/45.7 R, 45.7 RL, 260/45.8 A, 45.95 G, 45.7 PH, 45.9 NC, 45.9 QA, 45.7 S, 652.5 R, 45.85; 252/8.1

[56] References Cited

U.S. PATENT DOCUMENTS

| | | | |
|---|---|---|---|
| 2,627,475 | 2/1953 | Craig | 260/45.7 RL |
| 2,924,532 | 2/1960 | Dereick | 260/45.8 A |
| 2,957,848 | 10/1960 | Lotz | 260/45.7 RL |
| 3,260,760 | 7/1966 | Domen et al. | 260/652.5 R |
| 3,275,596 | 9/1966 | Klug et al. | 260/45.85 T |
| 3,282,882 | 11/1966 | Vuillemenot et al. | 260/45.95 G |
| 3,650,300 | 3/1972 | Listner | 260/45.7 RL |
| 3,652,494 | 3/1972 | Baker | 260/45.7 RL |
| 3,832,422 | 8/1974 | Little | 260/45.7 RL |
| 3,897,373 | 7/1975 | Bachl et al. | 260/45.7 RL |
| 3,957,905 | 5/1976 | Sumoto et al. | 260/45.7 RL |
| 4,032,481 | 6/1977 | Pillar | 260/45.7 RL |
| 4,111,905 | 9/1978 | Larkin et al. | 260/45.7 RL |
| 4,122,066 | 10/1978 | Nichols | 260/45.7 RL |

FOREIGN PATENT DOCUMENTS 917529 1/1947 France .

OTHER PUBLICATIONS

Handbook of Chemistry and Physics–Chem. Rubber Pub. Co., Cleveland, Ohio (1959), p. 751.

*Primary Examiner*—V. P. Hoke
*Attorney, Agent, or Firm*—Richard J. Schlott

[57] ABSTRACT

Trityl compounds wherein a triphenylmethyl group is attached to oxygen, divalent sulfur, trivalent nitrogen or a halogen are effective synergists for organic bromine flame retardants in polypropylene compositions.

19 Claims, No Drawings

FLAME RETARDANT POLYPROPYLENE COMPOSITIONS CONTAINING TRITYL SYNERGISTS

CROSS REFERENCE TO RELATED APPLICATIONS

This application is a continuation-in-part of U.S. application Ser. No. 853,617, filed Nov. 21, 1977 now abandoned, which is a continuation in part of U.S. applications Ser. No. 788,187, filed Apr. 18, 1977 now abandoned, Ser. No. 801,174, filed May 27, 1977 now abandoned and Ser. No. 788,185, filed Apr. 18, 1977, now abandoned.

BACKGROUND OF THE INVENTION

This invention relates to improved flame retardant polypropylene compositions. More particularly, this invention relates to flame retardant polypropylene compositions comprising polypropylene, organic bromine compounds as flame retardants and minor amounts of certain trityl compounds as synergists. Still more particularly, this invention relates to the use of certain trityl compounds as synergists for organic bromine flame retardants in polypropylene compositions.

Polypropylene is difficult to render flame retardant without resorting to high levels of flame retardant additives. It will be appreciated that large amounts of flame retardant additives will often have an adverse effect upon some of the physical properties of polypropylene, and will add appreciably to the cost. A method for enhancing the activity of flame retardants is needed for use with polypropylene which would permit achieving adequate flame retardancy with reduced levels of additives.

SUMMARY OF THE INVENTION

This invention provides flame retardant polypropylene compositions having organic bromine compounds as flame retardant additives and certain trityl compounds as synergists to enhance the effectiveness of the organic bromine compounds. The flame retardant compositions may further include conventional synergists such as antimony oxide and other flame retardants such as phosphorus compounds.

DETAILED DESCRIPTION OF THE INVENTION

The trityl compounds useful as synergists for use with organic bromine compounds in the practice of this invention may be generally described as having a triphenylmethyl (trityl) group attached to a nitrogen, sulfur, oxygen or halogen atom. More specifically, the synergists are compounds containing a trityloxy, trityl thio, or trityl amino group, or are trityl halides. Representative of trityloxy compounds are trityl alcohol, trityl ethers such as trityl methyl ether, trityl phenyl ether, ditrityl ether and the like, the trityl ethers of polyols such as the ditrityl ether of ethylene glycol, the tetratrityl ether of pentaerythritol, and esters of trityl alcohol such as trityl acetate, trityl benzoate, poly[trityl methacrylate] and the like. The trityl thio compounds include the thio analogs of trityloxy compounds such as trityl thiol, trityl thio ethers and esters of trityl thiol; the tritylamino compounds include the amino analogs of trityloxy compounds, i.e. the tritylamines and tritylamides. The trityl halides include trityl fluoride, trityl chloride and trityl bromide.

The trityl compounds synergistically enhance the flame retardant activity of organic bromine compounds in polypropylene. The organic bromine compounds are any of the conventional bromine-containing organic compounds generally known as flame retardants, such as for example tetrabromophthalic anhydride, tetrabromophthalimide, the brominated phenols and biphenyls, the esters and ethers of brominated phenols, as well as organic compounds containing both bromine and chlorine, and the bromine-containing organic compounds of phosphorus such as tris(2,3-dibromopropyl) phosphate and the like. In general, any organic bromine compound which may be employed as a flame retardant in polypropylene will be made more effective when further compounded with a trityl synergist according to the practice of this invention.

Organic bromine compounds are often used in combination with particular synergists such as antimony oxide, and with particular phosphorus compounds such as triphenyl phosphate, the alkyl pentaerythritol phosphates and the like in flame retardant compositions. When further compounded with trityl synergists according to the practice of this invention, the effectiveness of these combinations is also enhanced.

The polypropylenes which are useful for the practice of this invention are widely available in extrusion, injection molding and fiber grades, and include both the homopolymers of propylene and propylene copolymers containing minor amounts of ethylene or other olefins. Flame retardant compositions are obtained when compounded with organic bromine flame retardants, optionally including other flame retardants and synergists. The level of flame retardant organic bromine compound employed will vary depending upon the nature of the particular bromine compound and additional flame retardants selected, however the amounts generally employed in the art have ranged from about 1 part by weight to about 20 parts by weight per hundred parts of polypropylene.

The trityl compounds useful as synergists in the practice of this invention are those compounds wherein a triphenylmethyl group is attached to divalent oxygen (trityloxy compounds), divalent sulfur (trityl thio compounds), trivalent nitrogen (tritylamino compunds) or a halogen and include trityl alcohol, the carboxylic esters of trityl alcohol and the ethers of trityl alcohol; the thio analogs of trityl alcohol, trityl ethers and trityl esters are effective synergists as are trityl amine and N-substituted trityl amines such as 2°-trityl amines, trityl amides and the corresponding trityl azides, isocyanates, isothiocyanates and the like; trityl halides including trityl bromide, tritylchloride and trityl fluoride are also effective synergists.

Synergistic enhancement of flame retardant activity is accomplished by adding to these compositions, preferably at the time of compounding, from 0.1 parts by weight to 10 parts by weight of the synergistic triytyl compound per hundred parts of final compositions. The precise amount of trityl compound employed will vary with the particular bromine flame retardant compound employed, however it has been found that as little as 0.1 parts by weight of trityl compound per hundred parts of the final composition will enhance the activity of organic bromine flame retardants, with the optimum enhancement for most organic bromine compounds being exhibited when the weight of trityl compound is about 178 to 1/20 that of the organic bromine flame retardant compound present in the composition.

It will be understood that other methods for compounding may be employed, including preparing a mixture of the organic bromine compound and trityl synergist in the appropriate weight ratio and subsequently adding that composition to the polypropylene in a compounding operation.

It will also be understood that many of these trityl compounds have limited thermal stability. The conditions employed for processing compositions containing these synergists thus will be necessarily selected to minimize thermal decomposition of the synergists.

The invention will be better understood by consideration of the following examples, which are provided by way of illustration and not limitation.

Polypropylene compositions in the following Examples were prepared by blending the indicated ingredients in powder form in the amounts shown in Table I. The powder blends were then compression molded at 400°–450° F. into test specimens.

The test employed for determining flame retardant activity was ASTM D-2863, "Limiting Oxygen Index". The results are summarized in Tables I through VIII.

TABLE I

| Example No. | Polypropylene (Parts by wt) | Bromine[1] compd pbw | Trityl Compd[2] Type | pbw | LOI[3] |
|---|---|---|---|---|---|
| 1 | 100 | 0 | — | 0 | 17.5 |
| 2 | 95 | 5 | None | 0 | 19.4 |
| 3 | 94 | 5 | Tr—O—CH$_2$CH$_2$—O—Tr | 1 | 24.1 |
| 4 | 94 | 5 | Tr—NH$_2$ | 1 | 28.8 |
| 5 | 94 | 5 | Tr—NHφ | 1 | 28.8 |
| 6 | 94 | 5 | Tr—S—COCH$_3$ | 1 | 36.6 |

Notes:
[1]Bromine Compound = tetrabromophthalic anhydride.
[2]Tr— = (C$_6$H$_5$)$_3$C—, thus Tr—O—CH$_2$—CH$_2$O—Tr = (C$_6$H$_5$)$_3$C—O—CH$_2$CH$_2$—O—C(C$_6$H$_5$)$_3$; Tr—NH$_2$ = (C$_6$H$_5$)$_3$C—NH$_2$; Tr—NHφ = (C$_6$H$_5$)$_3$C—NH—C$_6$H$_5$; Tr—S—COCH$_3$ = (C$_6$H$_5$)$_3$C—S—COCH$_3$, etc.
[3]LOI = Limiting Oxygen Index, ASTM D2863

The data of Table I clearly demonstrate the remarkable synergistic effect of the trityl compounds. Although tetrabromophthalic anhydride alone (Example 2) increases the Limiting Oxygen Index value over that of uncompounded polypropylene (Example 1), the addition of 1 part of a trityl ether (Example 3), a trityl amine (Examples 4 and 5) or a trityl thioester (Example 6) produces a major further improvement in Limiting Oxygen Index.

TABLE II

| Example No. | Polypropylene Parts by wt. | Phosphorus[1] Compd pbw | Bromine[2] Compd pbw | Trityl Compound[3] Type | pbw | LOI[4] |
|---|---|---|---|---|---|---|
| 1 | 100 | 0 | 0 | none | — | 17.5 |
| 2 | 95 | 0 | 5 | none | — | 19.4 |
| 7 | 95 | 5 | 0 | none | — | 18.9 |
| 8 | 90 | 5 | 5 | none | — | 22.7 |
| 9 | 89 | 5 | 5 | Tr—NH$_2$ | 1 | 30.0 |
| 10 | 89 | 5 | 5 | Tr—NH—φ | 1 | 31.5 |
| 11 | 89 | 5 | 5 | Tr—OH | 1 | 31.1 |
| 12 | 89 | 5 | 5 | Tr—O—CH$_3$ | 1 | 28.1 |
| 13 | 89 | 5 | 5 | Tr—O—CH$_2$CH$_3$ | 1 | 30.6 |
| 14 | 89 | 5 | 5 | Tr—O—Tr | 1 | 29.0 |
| 15 | 89 | 5 | 5 | Tr—O—CH$_2$CH$_2$—O—Tr | 1 | 29.2 |
| 16 | 89 | 5 | 5 | Tr—SH | 1 | 24.1 |
| 17 | 89 | 5 | 5 | Tr—S—CH$_2$CH$_2$—S—Tr | 1 | 25.3 |
| 18 | 89 | 5 | 5 | Tr—S—CH$_2$—CH$_2$NH—CO$_2$H | 1 | 31.0 |
| 19 | 89 | 5 | 5 | Tr—NH—CH$_2$CO$_2$H | 1 | 30.8 |
| 20 | 89 | 5 | 5 | Tr—O—CH$_2$CH$_2$—OH | 1 | 31.3 |
| 21 | 89 | 5 | 5 | (Tr—O—CH$_2$)$_4$C | 1 | 28.8 |
| 22 | 89 | 5 | 5 | Tr—O—φ | 1 | 28.3 |
| 23 | 89 | 5 | 5 | Tr—S—φ | 1 | 30.6 |
| 24 | 89 | 5 | 5 | Tr—S—CH$_2$CO$_2$CH$_3$ | 1 | 26.8 |
| 25 | 89 | 5 | 5 | Tr—S—C(=N)(S—C$_6$H$_4$—O) (benzothiazole) | 1 | 29.0 |
| 26 | 89 | 5 | 5 | Tr—S—C(=N—CH$_2$)(S—CH$_2$) | 1 | 26.8 |
| 27 | 89 | 5 | 5 | φ$_2$—C(OH)—(naphthalenediol) | 1 | 32.5 |
| 28 | 89 | 5 | 5 | CH$_3$—O—C(φ)(φ)—C$_6$H$_4$—C(φ)(φ)—OCH$_3$ | 1 | 30.6 |

TABLE II-continued

| Example No. | Polypropylene Parts by wt. | Phosphorus[1] Compd pbw | Bromine[2] Compd pbw | Trityl Compound[3] Type | pbw | LOI[4] |
|---|---|---|---|---|---|---|
| 29 | 89 | 5 | 5 | (tris-phenoxy)C—OH (triphenyl with three O linkages) | 1 | 27.3 |
| 30 | 89 | 5 | 5 | $\phi_2$C—OH with furyl/N-heterocyclic ring | 1 | 33.5 |

Notes:
[1]Triphenylphosphate.
[2]Tetrabromophthalic Anhydride.
[3]Tr— = $(C_6H_5)_3$C—, thus TrNH$_2$ = $(C_6H_5)_3$C—NH$_2$, Tr—OH = $(C_6H_5)_3$C—OH; Tr—SH = $(C_6H_5)_3$C—SH, etc.
[4]LOI = Limiting Oxygen Index, ASTM D-1863.

The compositions of Table II employ a combination of a bromine compound, tetrabromophthalic anhydride, and a phosphorus compound, triphenyl phosphate, as flame retardants. This combination, at 10 wt% (Example 8) improves the L.O.I. value over that of uncompounded polypropylene, (Example 1) and over the L.O.I. values for compositions containing either component alone (Examples 2 and 7).

The further addition of 1 part by weight of a tritylamino compound (Examples 9, 10 and 19), a trityloxy compound such as trityl alcohol (Example 11), a trityl ether (Examples 12–15 and 20–22), a tritylthio compound such as trityl thiol (Example 16), a thioether (Examples 17, 18, 23 and 24) or a trityl thio ether-containing heterocyclic compound (Examples 25 and 26) provides a remarkable and completely unexpected enhancement of flame retardance as measured by Limiting Oxygen Index value.

Trityl compounds having a ring-substituent on the trityl group (Examples 28 and 29) are also effective synergists, as are the analogs of trityl alcohol having heterocyclic rings (Example 30) or polyaromatic (naphthyl) rings (Example 27).

The data set forth in Tables I and II also demonstrate a functional equivalence in synergistic behavior between trityloxy compounds and the analogous tritylthio and tritylamino compounds. Thus, trityl alcohol (Example 11), tritylthiol (Example 16) and trityl amine (Example 9) are all effective synergists. Similarly, trityl phenyl ether (Example 22), trityl phenyl thioether (Example 23) and trityl phenyl amine (Example 10) are effective synergists, as are the ditrityl ether of ethylene glycol (Example 15) and its thio analog, 1,2-bis (trithylthio) ethane (Example 17), as well as N-trityl glycine (Example 19) and the corresponding 2-(tritylthio) acetic acid (methylester) (Example 24).

TABLE III

| Example No. | Polypropylene Parts by wt. | Phosphorus[1] Compd pbw | Bromine[2] Compd pbw | Trityl Compound[3] Type | pbw | LOI[4] |
|---|---|---|---|---|---|---|
| 31 | 89 | 5 | 5 | Tr—O—COCH$_3$ | 1 | 29.0 |
| 32 | 89 | 5 | 5 | Tr—S—COCH$_3$ | 1 | 36.2 |
| 33 | 97.25 | 1.25 | 1.25 | Tr—S—COCH$_3$ | 0.25 | 25.7 |
| 34 | 89 | 5 | 5 | Tr—S—CO$\phi$ | 1 | 35.3 |
| 35 | 89 | 5 | 5 | TrS—COCH$_2$CH$_2$COS—Tr | 1 | 27.1 |
| 36 | 89 | 5 | 5 | TrS—CO(CH$_2$)$_8$CH$_3$ | 1 | 32.2 |
| 37 | 89 | 5 | 5 | Tr—NH—CHO | 1 | 28.1 |
| 38 | 89 | 5 | 5 | Tr—NCS | 1 | 32.0 |
| 39 | 89 | 5 | 5 | Tr—N$_3$ | 1 | 31.0 |
| 40 | 89 | 5 | 5 | Tr—NH—COCH$_3$ | 1 | 28.0 |
| 41 | 89 | 5 | 5 | Tr—S—CO—(C$_6$H$_4$O)—COS—Tr | 1 | 26.8 |
| 42 | 89 | 5 | 5 | [CH$_2$—CCH$_3$]$_n$ with Tr—OCO side chain | 1 | 29.8 |

Notes:
[1]Triphenylphosphate.
[2]Tetrabromophthalic Anhydride.
[3]Tr— = $(C_6H_5)_3$C—
[4]LOI = Limiting Oxygen Index, ASTM D-2863.

As shown in Table III, the carboxylic esters of trityl alcohol such as trityl acetate and the polymer of trityl methacrylate (Example 42), the carboxylic esters of trityl thiol (Examples 32–36 and 41) as well as the amino analog of esters, ie the amides of tritylamine (Examples 37 and 40), are also effective synergists. The remarkable enhancement of flame retardance makes possible a substantial reduction in the level of flame retardant additives, as is demonstrated by Example 33. Further derivatives of trityl amine, including the isothiocyanates (Example 38), which may be regarded as a thioimide, and trityl azide (Example 39), are also effective synergists.

TABLE IV

| Example No. | Polypropylene Parts by wt | Bromine[1] Compd pbw | Trityl Compd[2] Type | pbw | LOI[3] |
|---|---|---|---|---|---|
| 1 | 100 | — | — | — | 17.5 |
| 43 | 95 | 5 | None | — | 26.4 |
| 44 | 94 | 5 | Tr—OH | 1 | 29.8 |
| 45 | 94 | 5 | Tr—O—CH$_2$CH$_2$—O—Tr | 1 | 30.0 |

Notes:
[1]Bromine Compound = tris(2,3-dibromopropyl) phosphate;
[2]Tr— = (C$_6$H$_5$)$_3$C—
[3]LOI = Limiting Oxygen Index, ASTM D-2863

The data of Table IV also clearly demonstrate the remarkable synergistic effect of these trityl compounds. Although tris(2,3-dibromopropyl) phosphate increases the Limiting Oxygen Index value greatly over that of uncompounded polypropylene (compare Example 1 with Example 43), the addition of 1 part by weight of trityl alcohol (Example 44) or ethylene glycol ditrityl ether (Example 45) produces a major further improvement in Limiting Oxygen Index.

Trityl halides are also highly effective synergists for organic bromine flame retardants as is shown by the data in Table V.

TABLE V

| Example No. | Polypropylene Parts by wt. | Flame Retardant[1] Type | pbw | Trityl Compd[2] Type | pbw | LOI[3] |
|---|---|---|---|---|---|---|
| 1 | 100 | None | — | None | — | 17.5 |
| 8 | 90 | PHT$_4$ ($\phi$O)$_3$PO | 5 5 | None | — | 22.7 |
| 46 | 89 | PHT$_4$ ($\phi$O)$_3$PO | 5 5 | TrF | 1 | 30.5 |
| 47 | 89 | PHT$_4$ ($\phi$O)$_3$PO | 5 5 | TrCl | 1 | 31.7 |
| 48 | 89 | PHT$_4$ ($\phi$O)$_3$PO | 5 5 | TrBr | 1 | 27.7 |
| 49 | 95 | ($\phi$O)$_3$PO | 5 | None | — | 18.9 |
| 50 | 94 | ($\phi$O)$_3$PO | 5 | TrCl | 1 | 19.1 |
| 51 | 94 | PHT$_4$ | 5 | TrCl | 1 | 24.1 |
| 52 | 99 | None | — | TrCl | 1 | 17.5 |

Notes:
[1]See Table II, notes 1 and 2.
[2]TrF = (C$_6$H$_5$)$_3$CF; TrCl = (C$_6$H$_5$)$_3$CCl; TrBr = (C$_6$H$_5$)$_3$CBr.
[3]LOI = Limiting Oxygen Index, ASTM D-2863.

Trityl halides effect a marked improvement in L.O.I. for polypropylene compositions containing an organic bromine flame retardant alone (Example 51) or in combination with a phosphorus compound (Examples 46–48). The trityl compounds are not synergists for the phosphorus compound (compare Example 49 with Example 50), nor are they flame retardants by themselves (Example 52).

TABLE VI

| Example No. | Polypropylene Parts by wt. | Flame Retardants[1] Type | pbw | Trityl chloride pbw | LOI[2] |
|---|---|---|---|---|---|
| 1 | 100 | None | — | 0 | 17.5 |
| 53 | 95 | F-100 | 5 | 0 | 20.7 |
| 54 | 94 | F-100 | 5 | 1 | 24.7 |
| 55 | 95 | HB-32 | 5 | 0 | 26.4 |
| 56 | 94 | HB-32 | 5 | 1 | 31.0 |
| 57 | 90 | HB-32 | 10 | 0 | 29.5 |
| 58 | 89 | HB-32* | 10 | 1 | 35.4 |
| 59 | 90 | PE-TBP | 10 | 0 | 19.1 |
| 60 | 89 | PE-TBP | 10 | 1 | 26.8 |
| 61 | 92.5 | F-100 Sb$_2$O$_3$ | 5 2.5 | 0 | 24.6 |
| 62 | 91.5 | F-100 Sb$_2$O$_3$ | 5 2.5 | 1 | 26.3 |
| 63 | 90 | PHT-4 ($\phi$O)$_3$PO | 5 5 | 0 | 22.7 |
| 64 | 89 | PHT-4 ($\phi$O)$_3$PO | 5 5 | 1 | 31.7 |
| 65 | 90 | TBT ($\phi$O)$_3$PO | 5 5 | 0 | 21.7 |
| 66 | 89 | TBT ($\phi$O)$_3$PO | 5 5 | 1 | 27.71 |
| 67 | 90 | TBP ($\phi$O)$_3$PO | 5 5 | 0 | 25.9 |
| 68 | 89 | TBP ($\phi$O)$_3$PO | 5 5 | 1 | 28.0 |
| 69 | 90 | TBPB ($\phi$O)$_3$PO | 5 5 | 0 | 21.2 |
| 70 | 89 | TBPB ($\phi$O)$_3$PO | 5 5 | 1 | 27.1 |

Notes:
[1]F-100 = Commercial brominated chlorinated hydrocarbon Flame Retardant from Pearsall Chemical Corp., Houston, Texas; PHT-4 = tetrabromophthalic anhydride; HB-32 = tris(2,3-dibromopropyl) phosphate. TBT = tetrabromothiophene; TBP = Tribromophenol; TBPB = tetrabromophenylbenzoate; PE-TBPB = pentarethythritol di(tribromophenyl) phosphate.
[2]LOI = Limiting Oxygen Index, ASTM D-2863.

Trityl compounds are synergists for a variety of organic bromine compounds employed as flame retardants in polypropylene. The addition of a minor amount of a synergistic trityl compound to compositions containing an organic bromine compound and a conventional synergist such as antimony oxide or a phosphorus compound produces a further and completely unexpected enhancement of flame retardant activity as is apparent from the L.O.I data presented in Table VI.

TABLE VII

| Example No. | Polypropylene Parts by wt. | Flame Retardant[1] Compd | pbw | Trityl chloride pbw | LOI[2] |
|---|---|---|---|---|---|
| 1 | 100 | None | — | 0 | 17.5 |
| 7 | 95 | ($\phi$O)$_3$PO | 5 | 0 | 18.9 |
| 71 | 90 | PHT-4Cl ($\phi$O)$_3$PO | 5 5 | 0 | 19.1 |
| 72 | 89 | PHT-4Cl ($\phi$O)$_3$PO | 5 5 | 1 | 19.9 |

Notes:
[1]PHT-4Cl is tetrachlorophthalic anhydride.
[2]LOI is Limiting Oxygen Index, ASTM D-2863.

It will be apparent from the data presented in Table VII that Tetrachlorophthalic anhydride, a known flame retardant, is only marginally effective in polypropylene at these levels, and the addition of a trityl compound does not significantly enhance the activity of this chlorine compound.

TABLE VIII

| Example No. | Polypropylene Parts by wt. | Flame Retardant[1] Type | pbw | Trityl Compd[2] Type | pbw | LOI[3] |
|---|---|---|---|---|---|---|
| 1 | 100 | None | — | None | — | 17.5 |
| 43 | 95 | HB-32 | 5 | None | — | 26.4 |
| 73 | 94 | HB-32 | 5 | TR—H | 1 | 25.7 |
| 8 | 90 | PHT-4 ($\phi$O)$_3$PO | 5 5 | None | — | 22.7 |

TABLE VIII-continued

| Example No. | Polypropylene Parts by wt. | Flame Retardant[1] Type | pbw | Trityl Compd[2] Type | pbw | LOI[3] |
|---|---|---|---|---|---|---|
| 74 | 89 | PHT-4 | 5 | TrH | 1 | 20.2 |
|  |  | (φO)₃PO | 5 |  |  |  |
| 75 | 89 | PHT-4 | 5 | Tr—C₆H₅ | 1 | 22.3 |
|  |  | (φO)₃PO | 5 |  |  |  |

Notes:
[1] HB-32 = tris(2,3-dibromopropyl) phosphate; PHT-4 = tetrabromo-phthalic anhydride; (φO)₃PO = triphenylphosphate.
[2] TrH = (C₆H₅)₃C-H; Tr—C₆H₅ = (C₆H₅)₃C—C—C₆H₅.

Synergistic activity for organic bromine flame retardant compounds clearly is not a property common to all compounds containing the triphenylmethyl or trityl group; where the trityl group is attached to a nitrogen, sulfur or oxygen, as in trityl alcohol, trityl ethers, trityl esters and the amino and thio analogs thereof, synergistic enhancement is great, yet where the trityl group is attached to hydrogen as in triphenylmethane (Examples 73 and 74) or to phenyl (Example 75), no synergistic enhancement results as seen by comparison of the L.O.I. values for these Examples with control Examples 1, 8 and 43.

The invention will thus be seen to be flame retardant polypropylene compositions comprising polypropylene and organic bromine flame retardant compounds which exhibit synergistically improved flame retardance by way of the addition of minor amounts of particular trityl compounds. The trityl compounds useful in the practice of this invention are compounds having a structure selected from the group consisting of:

Trityl-X and Trityl-A-R₁ wherein X is selected from the group consisting of —F, —Cl, —Br, —N₃ and —NCS; and wherein A is selected from the group consisting of —O—, —S— and —NH—; and wherein R₁ is selected from the group consisting of —H and carbon-containing organic radicals having a carbon atom as the point of attachment to —A—.

It will be apparent from the Examples given hereinbefore that wherein R₁ is an organic radical, any acyclic, cyclic, heterocyclic, aromatic or heteroaromatic carbon-containing radical may be employed, and that said R₁ groups may further include such common substituents thereon as hydroxyl groups, carboxylate groups, amino groups, alkoxyl groups and the like. The R₁ radical, other than —H, will be attached to —A— through a carbon atom. Representative of R₁ are radicals selected from the group

—H

—alkyl

-aralkyl

-aryl $$-\underset{\|}{\overset{O}{C}}-H$$

$$-\underset{\|}{\overset{O}{C}}-alkyl$$

$$-\underset{\|}{\overset{O}{C}}-aryl$$

-continued

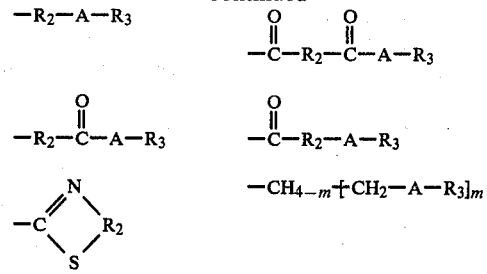

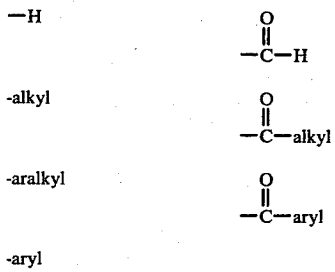

wherein R₂ is selected from the group consisting of -alkylene- and -arylene-, R₃ is selected from the group consisting of —H, -alkyl, -aralkyl and -aryl, m is 3 or 4 and —A— has the meaning given above.

It will be understood that polymeric analogs of the R₁ group, such as for example polyacrylates, as well as R₁ groups having such further substituents as amino, hydroxyl, alkoxy, alkyl and aryl groups attached thereto are included within the definition of the R₁ radical. Thus, for example, the term "alkylene" includes such radicals as —CH₂—CH₂— as well as

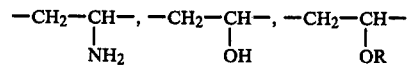

and the like. It will also be understood that the term "trityl," is defined as a triphenylmethyl or (C₆H₅)₃C— radical. Also useful are analogs thereof such as the diphenyl napthyl methyl or (C₆H₅)₂ (C₁₀H₇)C— radical, the diphenyl pyridyl or (C₆H₅)₂ (C₅H₄N)C— radical and triphenylmethyl radicals having substituents attached to one or more of the phenyl groups.

Addition of small amounts of these trityl compounds to flame retardant compositions of propylene and organic bromine flame retardants either alone or together with other known synergists, is an effective method for synergistically enhancing the activity of the flame retardants.

We claim:

1. In a flame retardant polypropylene composition comprising polypropylene and an organic bromine flame retardant compound, the improvement wherein a trityl synergist is included therein, said trityl synergist having a structure selected from the group consisting of Trityl-X and Trityl—A—R₁ wherein X is selected from the group consisting of —F, —Cl, —Br, —NCS and —N₃; and
wherein A is selected from the group consisting of —O—, —S— and —NH—; and
wherein —R₁ is —H or a carbon-containing radical attached through a carbon atom to —A—.

2. In a flame retardant polypropylene composition comprising polypropylene and an organic bromine flame retardant compound, the improvement wherein a trityl synergist is included therein, said trityl synergist having the structure Trityl —A—R₁ wherein —A— is selected from the group consisting of —O—, —S— and —NH—; and wherein $R_1$ is —H or a carbon-containing radical attached through a carbon atom to —A—.

3. The composition of claim 2 when $R_1$ is a carbon-containing radical and wherein the carbon atom attached to —A— is a carbonyl carbon atom.

4. The composition of claim 2 wherein $R_1$ is a carbon-containing radical and wherein the carbon atom attached to —A— is contained within an aromatic ring.

5. The composition of claim 2 wherein $R_1$ is a carbon-containing radical and wherein the carbon atom attached to —A— is a methylene carbon atom.

6. The composition of claim 2 wherein $R_1$ is a carbon-containing radical and wherein the carbon atom attached to —A— is contained within a heterocyclic ring.

7. The composition of claim 2 wherein $R_1$ is a carbon-containing radical selected from the group consisting of acyclic, cyclic, heterocyclic, aromatic and heteroaromatic radicals.

8. The composition of claim 2 wherein $R_1$ is selected from the group consisting of:

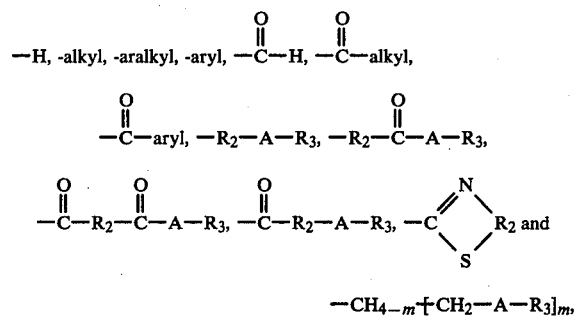

wherein $R_2$ may be alkylene or arylene, $R_3$ may be —H, alkyl, aralkyl or aryl, m is 3 or 4 and A has the meaning given hereinabove.

9. The composition of claim 2 wherein $R_1$ is H.

10. In a flame-retardant polypropylene composition comprising polypropylene and an organic bromine flame retardant compound, the improvement wherein a trityl synergist is included therein, said trityl synergist being a compound containing at least one trityl radical selected from the group consisting of trityloxy, trityl thio and tritylamino radicals, each of said trityl radicals being attached to hydrogen or a carbon atom of said compound, each said carbon atom being selected from the group consisting of carbonyl carbons, methylene carbons, carbons contained within an aromatic ring and carbons contained within a heterocyclic ring.

11. A composition adapted to render polypropylene flame retardant comprising an organic bromine flame retardant compound and a trityl synergist in the weight ratio of from 2:1 to about 20:1, said trityl synergist having a structure selected from the group consisting of Trityl-X and Trityl-A-$R_1$ wherein X is selected from the group consisting of —F, —Cl, —Br, —NCS and —N$_3$; and wherein A is selected from the group consisting of —O—, —S— and —NH—; and wherein —$R_1$ is —H or a carbon-containing radical attached through a carbon atom to —A—.

12. A composition adapted to render polypropylene flame retardant comprising an organic bromine flame retardant compound and a trityl synergist in the weight ratio of from 2:1 to about 20:1, said trityl synergist having a structure Trityl —A—$R_1$ wherein —A— is selected from the group consisting of —O—, —S— and —NH—; and wherein $R_1$ is —H or a carbon-containing radical attached through a carbon atom to —A—.

13. The composition of claim 12 wherein $R_1$ is a carbon-containing radical and wherein the carbon atom attached to —A— is a carbonyl carbon atom.

14. The composition of claim 12 wherein $R_1$ is a carbon-containing radical and wherein the carbon atom attached to —A— is contained within an aromatic ring.

15. The composition of claim 12 wherein $R_1$ is a carbon-containing radical and wherein the carbon atom attached to —A— is a methylene carbon atom.

16. The composition of claim 12 wherein $R_1$ is a carbon-containing radical and wherein the carbon atom attached to —A— is contained within a heterocyclic ring.

17. The composition of claim 12 wherein $R_1$ is a carbon-containing radical selected from the group consisting of acyclic, cyclic, heterocyclic, aromatic and heteroaromatic radicals.

18. The composition of claim 12 wherein $R_1$ is selected from the group consisting of:

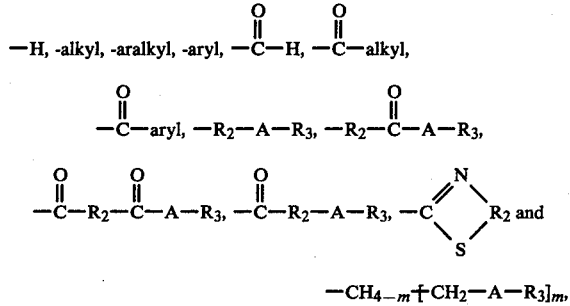

wherein $R_2$ may be alkylene or arylene, $R_3$ may be —H, alkyl, aralkyl or aryl, m is 3 or 4 and A has the meaning given hereinabove.

19. The composition of claim 12 wherein $R_1$ is H.

* * * * *